United States Patent
Chen et al.

(10) Patent No.: US 11,698,636 B2
(45) Date of Patent: Jul. 11, 2023

(54) FOOTHOLD POSITION CONTROL SYSTEM AND METHOD FOR BIPED ROBOT

(71) Applicant: Beijing Institute of Technology, Beijing (CN)

(72) Inventors: Xuechao Chen, Beijing (CN); Zhangguo Yu, Beijing (CN); Qiang Huang, Beijing (CN); Zhifa Gao, Beijing (CN); Runming Zhang, Beijing (CN); Zhenyuan Fu, Beijing (CN); Junyao Gao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/801,804

(22) PCT Filed: May 9, 2020

(86) PCT No.: PCT/CN2020/089343
§ 371 (c)(1),
(2) Date: Aug. 24, 2022

(87) PCT Pub. No.: WO2021/169043
PCT Pub. Date: Sep. 2, 2021

(65) Prior Publication Data
US 2023/0107084 A1    Apr. 6, 2023

(30) Foreign Application Priority Data
Feb. 25, 2020    (CN) .......................... 202010116012.6

(51) Int. Cl.
*G05D 1/00* (2006.01)
*B62D 57/032* (2006.01)
*G05D 1/02* (2020.01)

(52) U.S. Cl.
CPC .......... *G05D 1/0088* (2013.01); *B62D 57/032* (2013.01); *G05D 1/027* (2013.01);
(Continued)

(58) Field of Classification Search
CPC .. B62D 57/032; G05D 1/0088; G05D 1/0212; G05D 1/0246; G05D 1/0257; G05D 1/027; G05D 2201/0217
See application file for complete search history.

(56) References Cited

U.S. PATENT DOCUMENTS

| | | | |
|---|---|---|---|
| 5,545,960 | A | 8/1996 | Ishikawa |
| 2008/0243745 | A1 | 10/2008 | Kwok |
| 2021/0237265 | A1* | 8/2021 | Zhu .................. B25J 9/1602 |

FOREIGN PATENT DOCUMENTS

| | | |
|---|---|---|
| CN | 101833333 A | 9/2010 |
| CN | 102621986 A | 8/2012 |

(Continued)

OTHER PUBLICATIONS

Chencheng Dong, Zhangguo Yu, Member, IEEE, Xuechao Chen, Member, IEEE, Huanzhong Chen, Yan Huang, Member, IEEE, and Qiang Huang, Fellow, IEEE, Adaptability Control Towards Complex Ground Based on Fuzzy Logic for Humanoid Robots, Jun. 6, 2022 (Year: 2022).*

(Continued)

*Primary Examiner* — Hunter B Lonsberry
*Assistant Examiner* — Matthew J. Reda
(74) *Attorney, Agent, or Firm* — Bayramoglu Law Offices LLC

(57) ABSTRACT

A foothold position control system and method for a biped robot are provided. 1) A feasible collision-free path is planned by using a path planning algorithm; 2) an available foothold area of a swing foot is determined according to step-length constraints, movement capabilities, foot sizes, (Continued)

and center offsets of a biped robot; and 3) fuzzy processing is performed to determine a specific foothold position of the biped robot. Selection of suitable foothold positions on both sides of a path when a biped robot executes specific walking actions after finishing path planning is realized. The foothold position control system and method has the advantages of being simple and easy to implement, having low computational load and high speed, being capable of exerting extreme movement capabilities of different biped robots, enabling more flexible movement of the biped robots, and so on.

12 Claims, 6 Drawing Sheets

(52) U.S. Cl.
CPC ......... *G05D 1/0212* (2013.01); *G05D 1/0246* (2013.01); *G05D 1/0257* (2013.01); *G05D 2201/0217* (2013.01)

(56) References Cited

FOREIGN PATENT DOCUMENTS

| CN | 103324196 A | 9/2013 |
| CN | 107132844 A | 9/2017 |
| CN | 108614561 A | 10/2018 |

OTHER PUBLICATIONS

Dae-Hyung Park, Heiko Hoffmann, Peter Pastor, and Stefan Schaal, Movement reproduction and obstacle avoidance with dynamic movement primitives and potential fields, Dec. 1-3, 2008 (Year: 2008).*

* cited by examiner

FOOTHOLD POSITION CONTROL SYSTEM AND METHOD FOR BIPED ROBOT

CROSS REFERENCE TO THE RELATED APPLICATIONS

This application is the national phase entry of International Application No. PCT/CN2020/089343, filed on May 9, 2020, which is based upon and claims priority to Chinese Patent Application No. 202010116012.6, filed on Feb. 25, 2020, the entire contents of which are incorporated herein by reference.

TECHNICAL FIELD

The present disclosure belongs to the technical field of biped robots, and specifically, relates to a foothold position control system and method for a biped robot.

BACKGROUND

With the development of science and technology, there are more and more kinds of robots which have been more and more widely used. A biped robot is a comprehensive electromechanical integration platform integrating multiple disciplines such as mechanics, sensing, electronics, control, artificial intelligence, and bionics. The biped robot has a humanoid structure and is easy to implement most human actions, and is even more suitable for accomplishing some tasks in the areas of disaster relief, family services, aerospace, and so on. Although the biped robot has achieved remarkable results in walking, running, jumping, and so on, and has made great progress in straight walking, balance adjustment, modular management, and other control aspects, there is still a big gap in intelligent and autonomous movement compared with other types of robots or the human beings the biped robot imitates. Especially when a path from a start location to a task location is known in the environment, the selection of a foothold position after the biped robot specifically takes a step is particularly important and directly affects the performance of the robot such as the capability of following the path, flexibility, walking balance, and stability.

In the prior art, 10 to 50 available foothold positions of a swing foot with respect to a support foot are established in advance by permutation and combination according to structural constraints and movement capabilities of the biped robot, and are combined into one to three sets. In this way, other steps the biped robot may take at a certain time and under certain circumstances are severely restricted in the x-coordinate direction, y-coordinate direction, and angular direction, and the foothold position is limited to these fixed options, which is unfavorable for flexible movement of the biped robot. Besides, the non-autonomous and non-intelligent characteristics of the biped robot have been decided in selecting the foothold position from the fixed sets, and the foothold position is actually determined as soon as a planned path from a start position to a target position is determined in some methods, in which there is no process of selecting variable foothold positions.

SUMMARY

In view of the deficiencies in the prior art, the present disclosure provides a foothold position control system and method for a biped robot, where after path planning, fuzzy processing is performed to determine a specific foothold position of a robot, and the foothold position is variable, thereby ensuring flexibility and stability when the robot lands.

The present disclosure achieves the aforementioned technical objective by the following technical means.

A foothold position control system for a biped robot includes a laser radar or vision sensor, a gyroscope, a six-component force sensor, and an industrial computer, where a fuzzy controller in the industrial computer separately uses $x_{sd}$, $x_{en}$, $y_{sd}$, $y_{en}$, $\theta_{sd}$, and $\theta_{pt}$ as inputs and performs fuzzy processing to obtain a specific foothold position of a swing foot in an available foothold area, where $x_{sd}$, $y_{sd}$ is a real-time position of a support foot of a biped robot obtained by the six-component force sensor, $x_{en}$, $y_{en}$ is a position of an obstacle in a robot body coordinate system obtained by the laser radar or vision sensor, $\theta_{sd}$ is an initial yaw angle of the biped robot obtained by the gyroscope, and $\theta_{pt}$ is an angle between a straight line formed by a current path node and an associated path node in a next step and an x axis of a world coordinate system.

In the aforementioned technical solution, the $$\theta_{pt} = \tan^{-1}\frac{y_{pt+1} - y_{pt}}{x_{pt+1} - x_{pt}},$$

$$(x_{pt+1}, y_{pt+1}) = \min_{1 \leq i \leq n} \sqrt{(x_{next} - x_i)^2 + (y_{next} - y_i)^2};$$

where $x_{pt}$, $y_{pt}$ is a path node closest to a position of a current support foot, $x_{pt+1}$, $y_{pt+1}$ is a path node closest to a foothold position after a current swing foot lands, $x_{next}$, $y_{next}$ is a specific foothold position of the swing foot in an available foothold range, and $x_i$, $y_i$ is a path node.

A foothold position control method for a biped robot includes planning a passing path; determining an available foothold area of a swing foot on the passing path according to step-length constraints, movement capabilities, foot sizes, and center offsets of a biped robot; and performing fuzzy processing to determine a specific foothold position of the robot.

Further, the fuzzy processing includes fuzzification, fuzzy rule reasoning, and defuzzification.

Furthermore, a process of fuzzy processing on $x_{en}$ and $x_{sd}$ is: inputting $x_{pt}-x_{pt-1}$ and $x_{en}$, and outputting $\Delta x_{next}$;

(1) fuzzification fuzzifying $x_{pt}-x_{pt-1}$ as backward, small step forward, medium step forward, and big step forward, with corresponding ranges being respectively $$[-D_{min}, 0], \left[0, \frac{1}{2}D_{max}\right], \left[\frac{1}{3}D_{max}, \frac{2}{3}D_{max}\right], \text{ and } \left[\frac{1}{2}D_{max}, D_{max}\right];$$

fuzzifying $x_{en}$ as very near, near, medium, far, and very far, with corresponding ranges being respectively $$\left[\frac{1}{2}D_{max}, D_{max}\right], \left[\frac{3}{4}D_{max}, 2D_{max}\right], \left[\frac{3}{2}D_{max}, 3D_{max}\right],$$

$$\left[\frac{5}{2}D_{max}, 4D_{max}\right], \text{ and } [4D_{max}, 5D_{max}];$$

fuzzifying $\Delta x_{next}$ as backward, short, medium, and long, with corresponding ranges being respectively $$[-D_{min}, 0], \left[0, \frac{1}{2}D_{max}\right], \left[\frac{1}{3}D_{max}, \frac{2}{3}D_{max}\right], \text{ and } \left[\frac{1}{2}D_{max}, D_{max}\right],$$

where $D_{max}$ is a maximum forward movable distance of the swing foot, and $D_{min}$ is a maximum backward movable distance of the swing foot;

(2) fuzzy rule reasoning if $x_{pt}-x_{pt-1}$=backward, then $x_{next}$=backward;
if $x_{pt}-x_{pt-1}$=small step forward, and $x_{en}$=very near; then $x_{next}$=short;
if $x_{pt}-x_{pt-1}$=small step forward, and $x_{en}$=near; then $x_{next}$=short;
if $x_{pt}-x_{pt-1}$=small step forward, and $x_{en}$=medium; then $x_{next}$=medium;
if $x_{pt}-x_{pt-1}$=small step forward, and $x_{en}$=far; then $x_{next}$=long;
if $x_{pt}-x_{pt-1}$=small step forward, and $x_{en}$=very far; then $x_{next}$=long;
if $x_{pt}-x_{pt-1}$=medium step forward, and $x_{en}$=very near; then $x_{next}$=short;
if $x_{pt}-x_{pt-1}$=medium step forward, and $x_{en}$=near; then $x_{next}$=short;
if $x_{pt}-x_{pt-1}$=medium step forward, and $x_{en}$=medium; then $x_{next}$=medium;
if $x_{pt}-x_{pt-1}$=medium step forward, and $x_{en}$=far; then $x_{next}$=long;
if $x_{pt}-x_{pt-1}$=medium step forward, and $x_{en}$=very far; then $x_{next}$=long;
if $x_{pt}-x_{pt-1}$=big step forward, and $x_{en}$=very near; then $x_{next}$=short;
if $x_{pt}-x_{pt-1}$=big step forward, and $x_{en}$=near; then $x_{next}$=short;
if $x_{pt}-x_{pt-1}$=big step forward, and $x_{en}$=medium; then $x_{next}$=medium;
if $x_{pt}-x_{pt-1}$=big step forward, and $x_{en}$=far; then $x_{next}$=medium;
if $x_{pt}-x_{pt-1}$=big step forward, and $x_{en}$=very far; then $x_{next}$=long; and (3) defuzzification using a centroid method $$\Delta x_{next} = \frac{(x_{pt} - x_{pt-1})\mu_{x_{pt}-x_{pt-1}} + x_{en}\mu_{x_{en}}}{\mu_{x_{pt}-x_{pt-1}} + \mu_{x_{en}}}$$

where u is a membership value.

Furthermore, a process of fuzzy processing on $y_{en}$ and $y_{sd}$ is: inputting $y_{pt}-y_{pt-1}$ and $y_{en}$, and outputting $\Delta y_{next}$:

(1) fuzzification fuzzifying $y_{pt}-y_{pt-1}$ as inward, small swing outward, medium swing outward, and big swing outward, with corresponding ranges being respectively $$[L_{min}, B], \left[B, B + \frac{1}{2}(L_{max} - B)\right],$$
$$\left[B + \frac{1}{3}(L_{max} - B), B + \frac{2}{3}(L_{max} - B)\right], \text{ and } \left[B + \frac{1}{2}(L_{max} - B), L_{max}\right];$$

fuzzifying $y_{en}$ as very near, near, medium, far, and very far, with corresponding ranges being respectively $$[L_{max}, 2L_{max}], \left[\frac{3}{2}L_{max}, \frac{5}{2}L_{max}\right], [2L_{max}, 3L_{max}],$$

-continued $$\left[\frac{5}{2}L_{max}, \frac{7}{2}L_{max}\right], \text{ and } [3L_{max}, 4L_{max}];$$

fuzzifying $\Delta y_{next}$ as inward, small, medium, and large, with corresponding ranges being respectively $$[L_{min}, B], \left[B, B + \frac{1}{2}(L_{max} - B)\right],$$
$$\left[B + \frac{1}{3}(L_{max} - B), B + \frac{2}{3}(L_{max} - B)\right], \text{ and } \left[B + \frac{1}{2}(L_{max} - B), L_{max}\right],$$

where $L_{max}$ is a maximum outward movable distance, $L_{min}$ is a maximum inward movable distance, and B is a distance between projections of centers of gravity of two legs when the biped robot stands upright;

(2) fuzzy rule reasoning if $y_{pt}-y_{pt-1}$=inward, then $\Delta y_{next}$=inward;
if $y_{pt}-y_{pt-1}$=small swing outward, and $y_{en}$=very near; then $\Delta y_{next}$=small;
if $y_{pt}-y_{pt-1}$=small swing outward, and $y_{en}$=near; then $\Delta y_{next}$=small;
if $y_{pt}-y_{pt-1}$=small swing outward, and $y_{en}$=medium; then $\Delta y_{next}$=medium;
if $y_{pt}-y_{pt-1}$=small swing outward, and $y_{en}$=far; then $\Delta y_{next}$=large;
if $y_{pt}-y_{pt-1}$=small swing outward, and $y_{en}$=very far; then $\Delta y_{next}$=large;
if $y_{pt}-y_{pt-1}$=medium swing outward, and $y_{en}$=very near; then $\Delta y_{next}$=small;
if $y_{pt}-y_{pt-1}$=medium swing outward, and $y_{en}$=near; then $\Delta y_{next}$=small;
if $y_{pt}-y_{pt-1}$=medium swing outward, and $y_{en}$=medium; then $\Delta y_{next}$=medium;
if $y_{pt}-y_{pt-1}$=medium swing outward, and $y_{en}$=far; then $\Delta y_{next}$=large;
if $y_{pt}-y_{pt-1}$=medium swing outward, and $y_{en}$=very far; then $\Delta y_{next}$=large;
if $y_{pt}-y_{pt-1}$=big swing outward, and $y_{en}$=very near; then $\Delta y_{next}$=small;
if $y_{pt}-y_{pt-1}$=big swing outward, and $y_{en}$=near; then $\Delta y_{next}$=small;
if $y_{pt}-y_{pt-1}$=big swing outward, and $y_{en}$=medium; then $\Delta y_{next}$=medium;
if $y_{pt}-y_{pt-1}$=big swing outward, and $y_{en}$=far; then $\Delta y_{next}$=large;
if $y_{pt}-y_{pt-1}$=big swing outward, and $y_{en}$=very far; then $\Delta y_{next}$=large; and (3) defuzzification using a centroid method $$\Delta y_{next} = \frac{(y_{pt} - y_{pt-1})\mu_{y_{pt}-y_{pt-1}} + y_{en}\mu_{y_{en}}}{\mu_{y_{pt}-y_{pt-1}} + \mu_{y_{en}}}$$

where u is a membership value.

Furthermore, a process of fuzzy processing on $\theta_{sd}$ and $\theta_{pt}$ is: inputting $\theta_{sd}$ and $\theta_{pt}$, and outputting $\Delta \theta_{next}$:

(1) fuzzification fuzzifying $\theta_{sd}$ as inward yaw, small-amplitude outward yaw, medium-amplitude outward yaw, and large-amplitude outward yaw, with corresponding ranges being respectively $$[-\theta_{min}, 0], \left[0, \frac{1}{2}\theta_{max}\right], \left[\frac{1}{3}\theta_{max}, \frac{2}{3}\theta_{max}\right], \text{ and } \left[\frac{1}{2}\theta_{max}, \theta_{max}\right];$$

fuzzifying $\theta_{pt}$ as negative big orientation, negative small orientation, medium, positive small orientation, and positive big orientation, with corresponding ranges being respectively $$\left[-\frac{\pi}{2},-\frac{\pi}{4}\right], \left[-\frac{\pi}{3},-\frac{\pi}{6}\right], \left[-\frac{\pi}{4},\frac{\pi}{4}\right], \left[\frac{\pi}{6},\frac{\pi}{3}\right], \text{ and } \left[\frac{\pi}{4},\frac{\pi}{2}\right];$$

fuzzifying $\Delta\theta_{next}$ as inward yaw, small-amplitude outward yaw, medium-amplitude outward yaw, and large-amplitude outward yaw, with corresponding ranges being respectively $$\left[-\theta_{min},0\right], \left[0,\frac{1}{2}\theta_{max}\right], \left[\frac{1}{3}\theta_{max},\frac{2}{3}\theta_{max}\right], \text{ and } \left[\frac{1}{2}\theta_{max},\theta_{max}\right],$$

where $\theta_{min}$ is a maximum inward yaw angle of the swing foot, and $\theta_{max}$ is a maximum outward yaw angle of the swing foot;

(2) fuzzy rule reasoning when a support foot is a left foot:

if $\theta_{sd}$=inward yaw, and $\theta_{pt}$=negative big orientation; then $\Delta\theta_{next}$=large-amplitude outward yaw;

if $\theta_{sd}$=inward yaw, and $\theta_{pt}$=negative small orientation; then $\Delta\theta_{next}$=medium-amplitude outward yaw;

if $\theta_{sd}$=inward yaw, and $\theta_{pt}$=medium; then $\Delta\theta_{next}$=small-amplitude outward yaw;

if $\theta_{sd}$=inward yaw, and $\theta_{pt}$=positive small orientation; then $\Delta\theta_{next}$=inward yaw;

if $\theta_{sd}$=inward yaw, and $\theta_{pt}$=positive big orientation; then $\Delta\theta_{next}$=inward yaw;

if $\theta_{sd}$=small-amplitude outward yaw, and $\theta_{pt}$=negative big orientation; then $\Delta\theta_{next}$=large-amplitude outward yaw;

if $\theta_{sd}$=small-amplitude outward yaw, and $\theta_{pt}$=negative small orientation; then $\Delta\theta_{next}$=medium-amplitude outward yaw;

if $\theta_{sd}$=small-amplitude outward yaw, and $\theta_{pt}$=medium; then $\Delta\theta_{next}$=small-amplitude outward yaw;

if $\theta_{sd}$=small-amplitude outward yaw, and $\theta_{pt}$=positive small orientation; then $\Delta\theta_{next}$=inward yaw;

if $\theta_{sd}$=small-amplitude outward yaw, and $\theta_{pt}$=positive big orientation; then $\Delta\theta_{next}$=inward yaw;

if $\theta_{sd}$=medium-amplitude outward yaw, and $\theta_{pt}$=negative big orientation; then $\Delta\theta_{next}$=large-amplitude outward yaw;

if $\theta_{sd}$=medium-amplitude outward yaw, and $\theta_{pt}$=negative small orientation; then $\Delta\theta_{next}$=medium-amplitude outward yaw;

if $\theta_{sd}$=medium-amplitude outward yaw, and $\theta_{pt}$=medium; then $\Delta\theta_{next}$=inward yaw;

if $\theta_{sd}$=medium-amplitude outward yaw, and $\theta_{pt}$=positive small orientation; then $\Delta\theta_{next}$=inward yaw;

if $\theta_{sd}$=medium-amplitude outward yaw, and $\theta_{pt}$=positive big orientation; then $\Delta\theta_{next}$=inward yaw;

if $\theta_{sd}$=large-amplitude outward yaw, and $\theta_{pt}$=negative big orientation; then $\Delta\theta_{next}$=medium-amplitude outward yaw;

if $\theta_{sd}$=large-amplitude outward yaw, and $\theta_{pt}$=negative small orientation; then $\Delta\theta_{next}$=small-amplitude outward yaw;

if $\theta_{sd}$=large-amplitude outward yaw, and $\theta_{pt}$=medium; then $\Delta\theta_{next}$=inward yaw;

if $\theta_{sd}$=large-amplitude outward yaw, and $\theta_{pt}$=positive small orientation; then $\Delta\theta_{next}$=inward yaw;

if $\theta_{sd}$=large-amplitude outward yaw, and $\theta_{pt}$=positive big orientation; then $\Delta\theta_{next}$=inward yaw;

when the support foot is a right foot:

if $\theta_{sd}$=inward yaw, and $\theta_{pt}$=negative big orientation; then $\Delta\theta_{next}$=inward yaw;

if $\theta_{sd}$=inward yaw, and $\theta_{pt}$=negative small orientation; then $\Delta\theta_{next}$=inward yaw;

if $\theta_{sd}$=inward yaw, and $\theta_{pt}$=medium; then $\Delta\theta_{next}$=small-amplitude outward yaw;

if $\theta_{sd}$=inward yaw, and $\theta_{pt}$=positive small orientation; then $\Delta\theta_{next}$=medium-amplitude outward yaw;

if $\theta_{sd}$=inward yaw, and $\theta_{pt}$=positive big orientation; then $\Delta\theta_{next}$=large-amplitude outward yaw;

if $\theta_{sd}$=small-amplitude outward yaw, and $\theta_{pt}$=negative big orientation; then $\Delta\theta_{next}$=inward yaw;

if $\theta_{sd}$=small-amplitude outward yaw, and $\theta_{pt}$=negative small orientation; then $\Delta\theta_{next}$=inward yaw;

if $\theta_{sd}$=small-amplitude outward yaw, and $\theta_{pt}$=medium; then $\Delta\theta_{next}$=small-amplitude outward yaw;

if $\theta_{sd}$=small-amplitude outward yaw, and $\theta_{pt}$=positive small orientation; then $\Delta\theta_{next}$=medium-amplitude outward yaw;

if $\theta_{sd}$=small-amplitude outward yaw, and $\theta_{pt}$=positive big orientation; then $\Delta\theta_{next}$=large-amplitude outward yaw;

if $\theta_{sd}$=medium-amplitude outward yaw, and $\theta_{pt}$=negative big orientation; then $\Delta\theta_{next}$=inward yaw;

if $\theta_{sd}$=medium-amplitude outward yaw, and $\theta_{pt}$=negative small orientation; then $\Delta\theta_{next}$=inward yaw;

if $\theta_{sd}$=medium-amplitude outward yaw, and $\theta_{pt}$=medium; then $\Delta\theta_{next}$=inward yaw;

if $\theta_{sd}$=medium-amplitude outward yaw, and $\theta_{pt}$=positive small orientation; then $\Delta\theta_{next}$=small-amplitude outward yaw;

if $\theta_{sd}$=medium-amplitude outward yaw, and $\theta_{pt}$=positive big orientation; then $\Delta\theta_{next}$=medium-amplitude inward yaw;

if $\theta_{sd}$=large-amplitude outward yaw, and $\theta_{pt}$=negative big orientation; then $\Delta\theta_{next}$=inward yaw;

if $\theta_{sd}$=large-amplitude outward yaw, and $\theta_{pt}$=negative small orientation; then $\Delta\theta_{next}$=inward yaw;

if $\theta_{sd}$=large-amplitude outward yaw, and $\theta_{pt}$=medium; then $\Delta\theta_{next}$=inward yaw;

if $\theta_{sd}$=large-amplitude outward yaw, and $\theta_{pt}$=positive small orientation; then $\Delta\theta_{next}$=small-amplitude outward yaw;

if $\theta_{sd}$=large-amplitude outward yaw, and $\theta_{pt}$=positive big orientation; then $\Delta\theta_{next}$=medium-amplitude inward yaw; and (3) defuzzification defuzzification using a centroid method:

$$\Delta\theta_{next} = \frac{\theta_{pt}\mu_{\theta_{pt}} + \theta_{sd}\mu_{\theta_{sd}}}{\mu_{\theta_{pt}} + \mu_{\theta_{sd}}}$$

where u is a membership value.

Furthermore, the specific foothold position of the robot is $(x_{next}, y_{next}, \theta_{next})$, and $x_{next}=x_{sd}+\Delta x_{next}$, $y_{next}=y_{sd}+\Delta y_{next}$, and $\theta_{next}=\theta_{sd}+\Delta\theta_{next}$.

The beneficial effects of the present disclosure are as follows:

(1) In the present disclosure, $x_{sd}$, $x_{en}$, $y_{sd}$, $y_{en}$, $\theta_{sd}$, and $\theta_{pt}$ are separately used as inputs of a fuzzy controller, fuzzy processing is performed, fuzzy processing including fuzzification, fuzzy rule reasoning, and defuzzification, finally $x_{next}$, $y_{next}$, and $\theta_{next}$ are output, and a specific foothold position of a swing foot of a robot in an available foothold area is determined; and the planning of the foothold position is determining the available foothold area according to step-length constraints, movement capabilities, foot sizes, and center offsets of the biped robot, instead of setting foothold sets in advance and selecting few limited foothold positions in the foothold sets; it is unnecessary to design a limited number of foothold sets in advance, the flexibility of the biped robot is improved, and movement capabilities of the biped robot are fully exerted, so that the foothold of the biped robot after path planning can be selected in an autonomous and intelligent way.

(2) The fuzzy control process in the present disclosure considers the position of a closest path node, the position of an obstacle, and the position of a current support foot, so that the fuzzy control process is more precise and comprehensive, and the selection of the foothold position is more reasonable.

DETAILED DESCRIPTION OF THE EMBODIMENTS

The present disclosure is further illustrated below with reference to the accompanying drawings and specific embodiments, but the protection scope of the present disclosure is not limited thereto.

Figure 1:
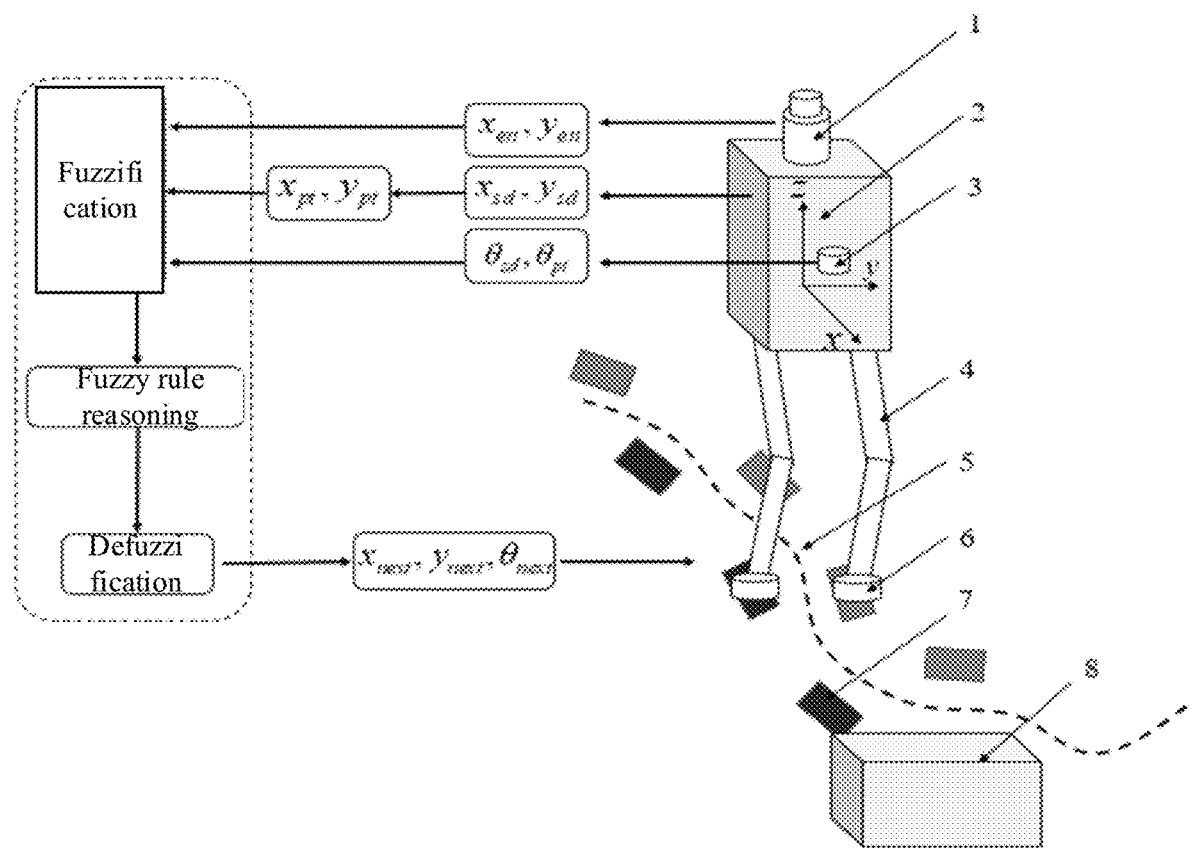
FIG. 1 is a schematic structural view of a foothold position control system for a biped robot in the present disclosure.
Figure 6:
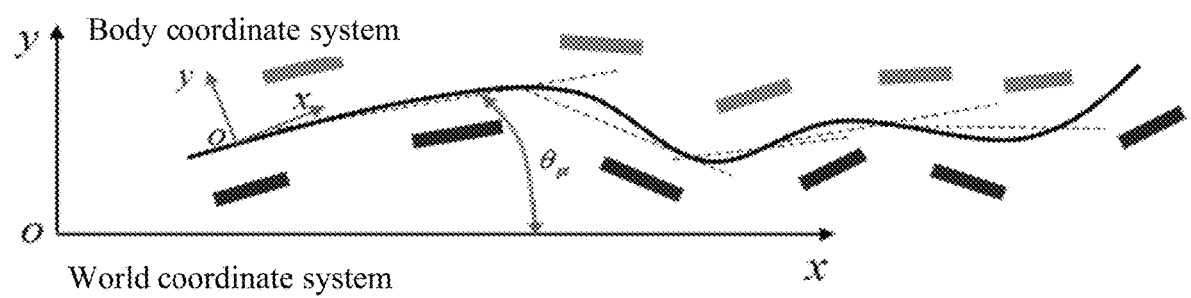
FIG. 6 is a schematic diagram of $\theta_{pt}$ in the present disclosure.

As shown in FIG. 1, a foothold position control system for a biped robot includes a laser radar or vision sensor 1, a gyroscope 3, a six-component force sensor 6, and an industrial computer; the laser radar or vision sensor 1 is disposed on the top of a biped robot body 2, and is used for obtaining environmental information of a biped robot, and position coordinates $(x_{en}, y_{en})$ of an obstacle 8 in the environmental information in a robot body coordinate system; the gyroscope 3 is disposed in the upper part of the biped robot body 2, and is used for obtaining an initial value of a yaw angle $\theta_{sd}$ of the biped robot; the six-component force sensor 6 is disposed in a sole of the biped robot body 2, and is used for obtaining a real-time position $(x_{sd}, y_{sd})$ of a support foot of the biped robot; the laser radar or vision sensor 1, the gyroscope 3, and the six-component force sensor 6 all perform signal transmission with the industrial computer, a fuzzy controller is disposed in the industrial computer, and the fuzzy controller converts the real-time position $(x_{sd}, y_{sd})$ of the support foot in a world coordinate system into a path node $(x_{pt}, y_{pt})$ closest to the position of the current support foot (see equation (1)); $x_{sd}$, $x_{en}$, $y_{sd}$, $y_{en}$, $\theta_{sd}$ and $\theta_{pt}$ are separately used as inputs of the fuzzy controller, and fuzzification, fuzzy rule reasoning, and defuzzification are performed to obtain a specific foothold position $(x_{next}, y_{next}, \theta_{next})$ of the swing foot in an available foothold range, and the swing foot is controlled to land. The $\theta_{pt}$ is an angle between a straight line formed by a current path node and an associated path node in a next step and an x axis of the world coordinate system (see FIG. 6) (see equations (4) and (5) for the obtaining process). The x-axis direction in the figure is the advancing direction of the robot, the y-axis direction is perpendicular to the advancing direction of the robot, and they form the robot body coordinate system; 4 is a lower limb of the robot, and 7 is a foothold position of the robot.

Figure 2:
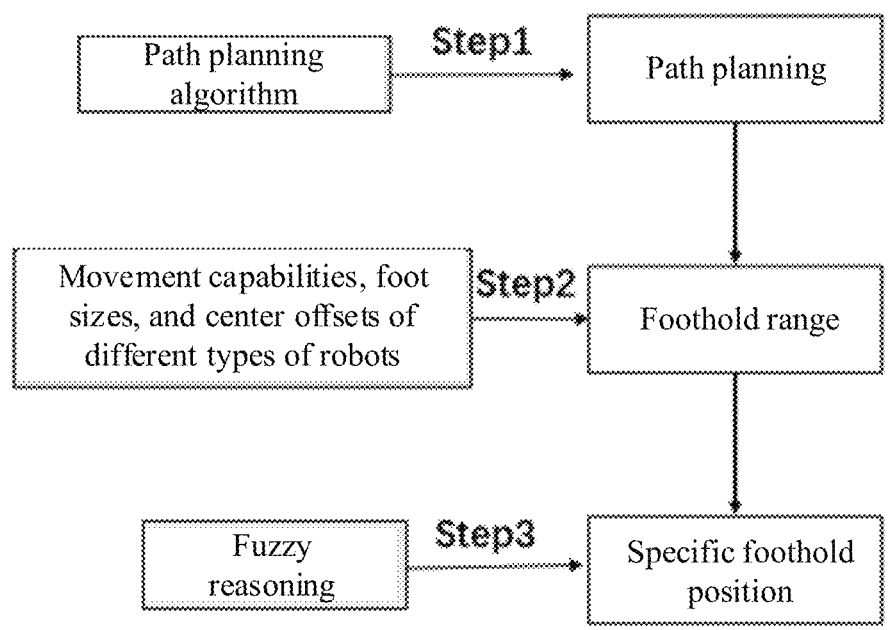
FIG. 2 is a flowchart of a foothold position control method for a biped robot in the present disclosure.

As shown in FIG. 2, a foothold position control method for a biped robot specifically includes the following steps:

Step (1): Path Planning

Figure 3:
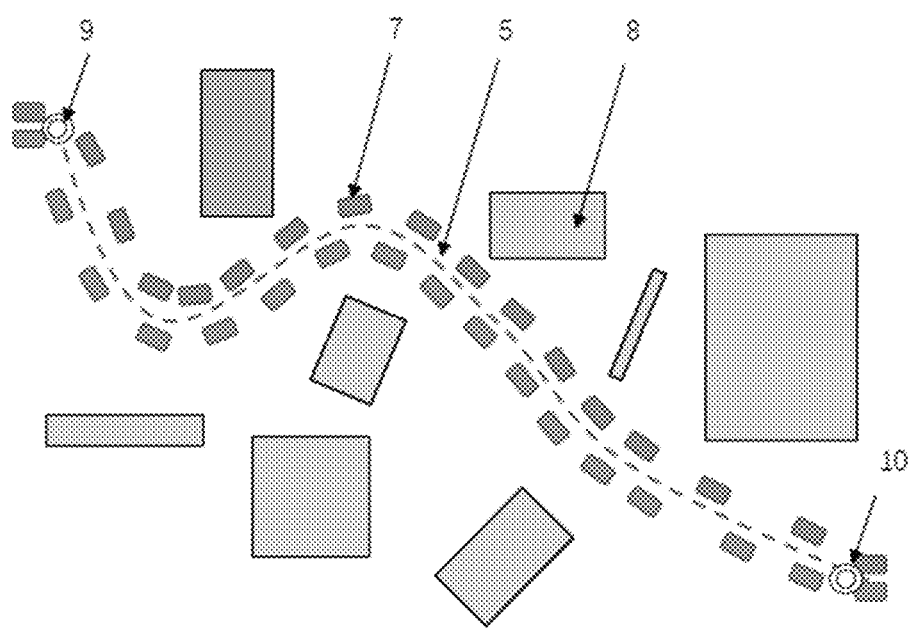
FIG. 3 is an overall effect diagram of a passing path in the present disclosure.

The laser radar or vision sensor 1 is mounted on the biped robot to obtain an environmental map, grid processing is performed on the environmental map, a start point $(x_{start}, y_{start})$ and a task goal $(x_{goal}, y_{goal})$ are set in the grid map, and an optimal collision-free path (namely, the path 5 in FIG. 3) from the start to the goal is planned by using an A* algorithm, where each path point is called a path node and represented as $(x_i, y_i)$ (i=1 ... n); that is, passable path nodes form a passable path Path=$(x_{start}, y_{start}) \cup (x_1, y_1) \ldots \cup (x_2, y_2) \ldots \cup (x_N, y_N) \cup (x_{goal}, y_{goal})$, as shown in FIG. 3, where 9 is the start, and 10 is the goal.

Step (2): Determining of Foothold Range

An available foothold area of the swing foot is determined according to step-length constraints, movement capabilities, foot sizes, and center offsets of a specific biped robot.

When the advancing direction of the biped robot is the x-axis direction, $x_{max}=x_{sd}+D_{max}$, $x_{min}=x_{sd}-D_{min}$, $y_{max}=y_{sd}+L_{max}$, $y_{min}=y_{sd}+L_{min}$;

when the advancing direction of the biped robot is along the y axis, $y_{max}=y_{sd}+D_{max}$, $y_{min}=y_{sd}-D_{min}$, $x_{max}=x_{stand}+L_{max}$, $x_{min}=x_{sd}+L_{min}$;

when the angle between the advancing direction of the biped robot and the x axis is $\theta$, $$x_{max} = x_{sd} + \frac{D_{max}}{\cos(\theta)}, x_{min} = x_{sd} - \frac{D_{min}}{\cos(\theta)}, y_{max} = y_{sd} + \frac{L_{max}}{\cos(\theta)},$$

$$y_{min} = y_{sd} + \frac{L_{min}}{\cos(\theta)}.$$

Figure 4:
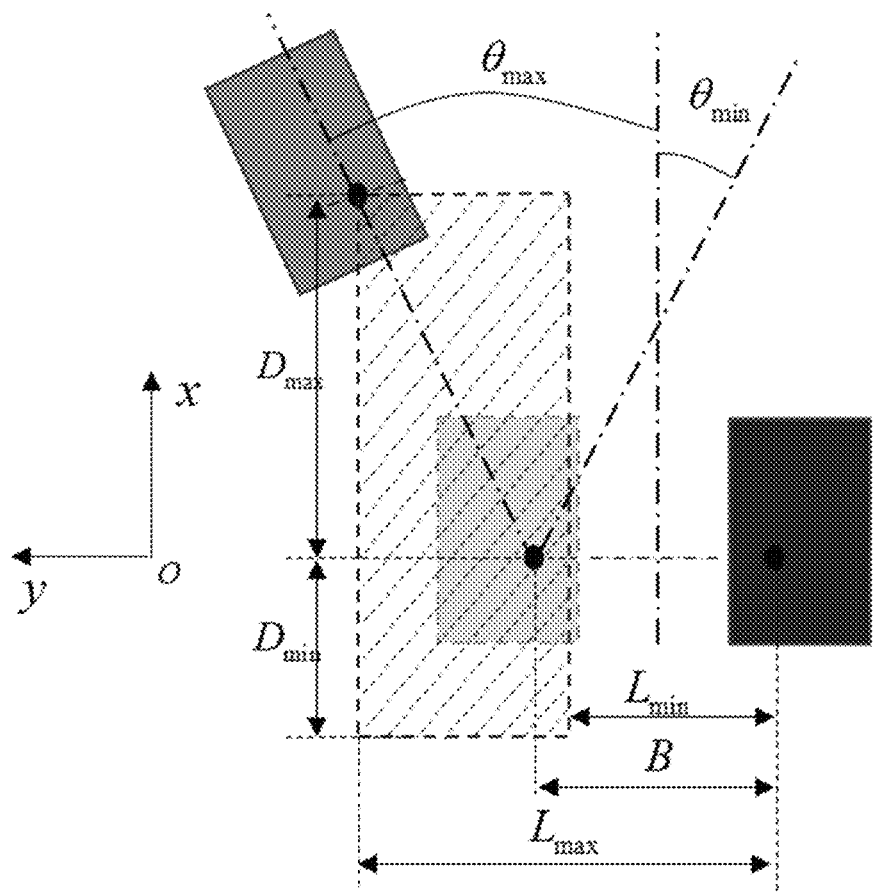
FIG. 4 is a schematic diagram of an available foothold area of a swing foot in the present disclosure.

Thus it can be determined that the available foothold area of the swing foot of the biped robot is $[x_{min}, x_{max}] \cup [y_{min}, y_{max}] \cup [\theta_{min}, \theta_{max}]$, as shown in FIG. 4, where the area in the dashed box is the available foothold area of the swing foot, where $\theta_{max}$ is a maximum outward yaw angle of the swing foot, $\theta_{min}$ is a maximum inward yaw angle of the swing foot, $D_{max}$ is a maximum forward movable distance, $D_{min}$ is a maximum backward movable distance, $L_{max}$ is a maximum outward movable distance, $L_{min}$ is a maximum inward movable distance, and B is a distance between projections of centers of gravity of two legs when the biped robot stands upright.

Step (3): Determining of Specific Foothold Position

Any $(x, y, \theta)$ combination in the available foothold area can represent a possible foothold position of the actual swing foot.

According to the position $(x_{sd}, y_{sd}, \theta_{sd})$ of the support foot, the position $(x_{pt}, y_{pt}, \theta_{pt})$ of the path node closest to the position of the support foot, and the position $(x_{en}, y_{en})$ of the obstacle in the environment, x, y, and $\theta$ are separately subjected to fuzzification processing in their respective ranges, subjected to fuzzy rule reasoning, and then subjected to defuzzification to finally obtain the specific foothold position $(x_{next}, y_{next}, \theta_{next})$ of the swing foot in the available foothold range.

$x_{sd}$, $x_{en}$, $y_{sd}$, $y_{en}$, $\theta_{sd}$, and $\theta_{pt}$ are separately used as inputs of fuzzy control, and the current support foot of the biped robot is the swing foot in the previous step; thus the value of the yaw angle $\theta_{sd}$ of the current support foot of the biped robot is the value of $\theta_{next-1}$ of the swing foot in the previous step.

Figure 5:
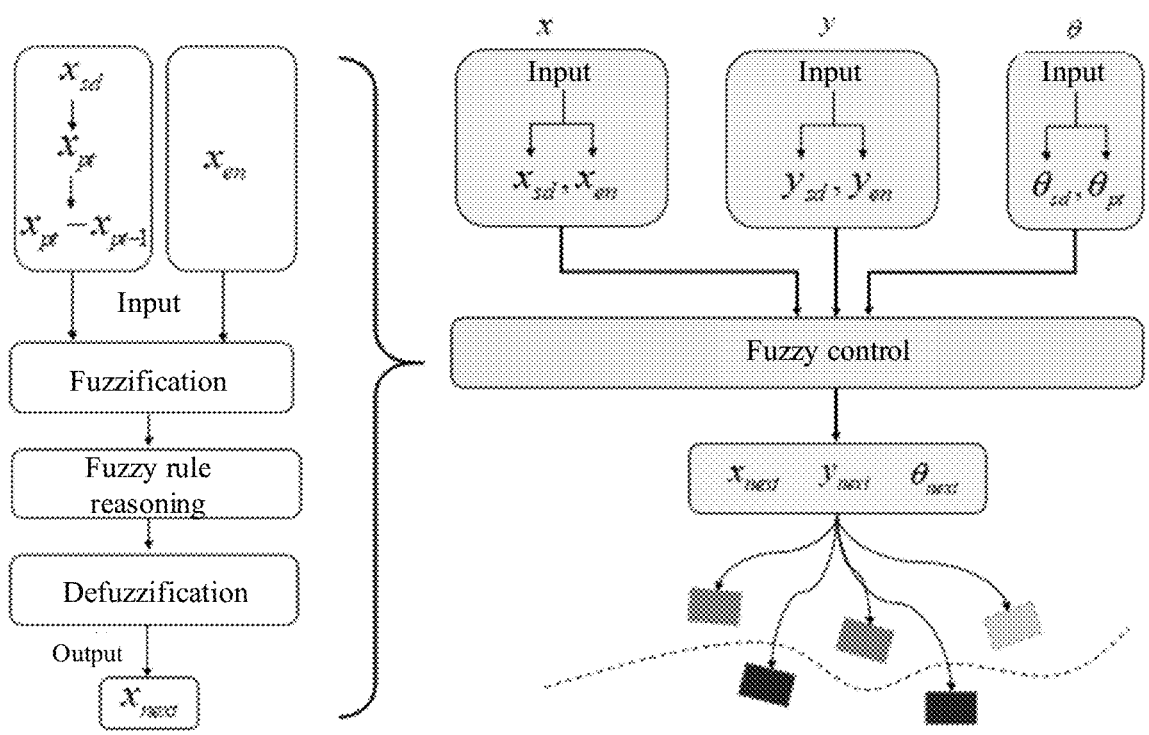
FIG. 5 is a schematic diagram of a fuzzy control process in the present disclosure.

As shown in FIG. 5, the process of fuzzy processing on $x_{en}$ and $x_{sd}$ is as follows:

① The position of the path node closest to the position of the support foot is obtained through $x_{sd}$ and $y_{sd}$:

$$(x_{pt}, y_{pt}) = \min_{1 \leq i \leq n} \sqrt{(x_{sd} - x_i)^2 + (y_{sd} - y_i)^2} \quad (1)$$

A difference $x_{pt}-x_{pt-1}$ between $x_{pt}$ calculated in this step and $x_{pt-1}$ in the last step is used as an input, and a step length of the next step is predicted through a step length of the last step; meanwhile, $x_{en}$ is used as another input, and the step length of the next step is predicted through the distance from the obstacle; $\Delta x_{next}$ is output according to fuzzy rules and reasoning.

② Fuzzification processing: the range of $x_{pt}-x_{pt-1}$ is determined approximately as the range $[-D_{min}, D_{max}]$ of one step length, and the range is fuzzified and divided into four stages: backward, small step forward, medium step forward, and big step forward, with corresponding ranges being respectively $$[-D_{min}, 0], \left[0, \frac{1}{2}D_{max}\right], \left[\frac{1}{3}D_{max}, \frac{2}{3}D_{max}\right], \text{ and } \left[\frac{1}{2}D_{max}, D_{max}\right];$$

a value range of $x_{en}$ is approximately represented as $$\left[\frac{1}{2}D_{max}, 5D_{max}\right]$$

and is fuzzified as very near, near, medium, far, and very far, with corresponding ranges being respectively $$\left[\frac{1}{2}D_{max}, D_{max}\right], \left[\frac{3}{4}D_{max}, 2D_{max}\right], \left[\frac{3}{2}D_{max}, 3D_{max}\right],$$
$$\left[\frac{5}{2}D_{max}, 4D_{max}\right], \text{ and } [4D_{max}, 5D_{max}];$$

the output $\Delta x_{next}$ is fuzzified as backward, short, medium, and long, with corresponding ranges being respectively $$[-D_{min}, 0], \left[0, \frac{1}{2}D_{max}\right], \left[\frac{1}{3}D_{max}, \frac{2}{3}D_{max}\right], \text{ and } \left[\frac{1}{2}D_{max}, D_{max}\right].$$

All the inputs use a triangle method as a membership function, and have respective membership values being $\mu_x$.

③ Fuzzy rules and reasoning:
IF $x_{pt}x_{pt-1}$=back THEN $x_{next}$=backward;
IF $x_{pt}-x_{pt-1}$=small step forward AND $x_{en}$=very near, THEN $x_{next}$=short;
IF $x_{pt}-x_{pt-1}$=small step forward AND $x_{en}$=near, THEN $x_{next}$=short;
IF $x_{pt}-x_{pt-1}$=small step forward AND $x_{en}$=medium, THEN $x_{next}$=medium;
IF $x_{pt}-x_{pt-1}$=small step forward AND $x_{en}$=far, THEN $x_{next}$=long;
IF $x_{pt}-x_{pt-1}$=small step forward AND $x_{en}$=very far, THEN $x_{next}$=long;
IF $x_{pt}-x_{pt-1}$=medium step forward AND $x_{en}$=very near, THEN $x_{next}$=short;
IF $x_{pt}-x_{pt-1}$=medium step forward AND $x_{en}$=near, THEN $x_{next}$=short;
IF $x_{pt}-x_{pt-1}$=medium step forward AND $x_{en}$=medium, THEN $x_{next}$=medium;
IF $x_{pt}-x_{pt-1}$=medium step forward AND $x_{en}$=far, THEN $x_{next}$=long;
IF $x_{pt}-x_{pt-1}$=medium step forward AND $x_{en}$=very far, THEN $x_{next}$=long;
IF $x_{pt}-x_{pt-1}$=big step forward AND $x_{en}$=very near, THEN $x_{next}$=short;
IF $x_{pt}-x_{pt-1}$=big step forward AND $x_{en}$=near, THEN $x_{next}$=short;
IF $x_{pt}-x_{pt-1}$=big step forward AND $x_{en}$=medium, THEN $x_{next}$=medium;
IF $x_{pt}-x_{pt-1}$=big step forward AND $x_{en}$=far, THEN $x_{next}$=medium;
IF $x_{pt}-x_{pt-1}$=big step forward AND $x_{en}$=very far, THEN $x_{next}$=long.

④ Defuzzification
Defuzzification is performed using a centroid method:

$$\Delta x_{next} = \frac{(x_{pt} - x_{pt-1})\mu_{x_{pt}-x_{pt-1}} + x_{en}\mu_{x_{en}}}{\mu_{x_{pt}-x_{pt-1}} + \mu_{x_{en}}} \quad (2)$$

The process of fuzzy processing on $y_{en}$ and $y_{sd}$ is as follows:

① The position $(x_{pt}, y_{pt})$ of the path node closest to the position of the support foot is obtained from equation (1).

A difference $y_{pt}-y_{pt-1}$ between $y_{pt}$ calculated in this step and $y_{pt-1}$ in the last step is used as an input, and a step length of the next step is predicted through a step length of the last step; meanwhile, $y_{en}$ is used as another input, and the step length of the next step is predicted through the distance from the obstacle; $y_{next}$ is output according to fuzzy rules and reasoning.

② Fuzzification processing: the range of $y_{pt}-y_{pt-1}$ is determined approximately as the range $[L_{min}, L_{max}]$ of one step swing, and the range is fuzzified and divided into four stages: inward, small swing outward, medium swing outward, and big swing outward, with corresponding ranges being respectively $$[L_{min}, B], \left[B, B + \frac{1}{2}(L_{max} - B)\right],$$
$$\left[B + \frac{1}{3}(L_{max} - B), B + \frac{2}{3}(L_{max} - B)\right], \text{ and } \left[B + \frac{1}{2}(L_{max} - B), L_{max}\right];$$

a value range of $y_{en}$ is approximately represented as $[L_{max}, 4L_{max}]$, and fuzzified as very near, near, medium, far, and very far, with corresponding ranges being respectively $$[L_{max}, 2L_{max}], \left[\frac{3}{2}L_{max}, \frac{5}{2}L_{max}\right], [2L_{max}, 3L_{max}], \left[\frac{5}{2}L_{max}, \frac{7}{2}L_{max}\right], \text{ and}$$
$$[3L_{max}, 4L_{max}];$$

the output $\Delta y_{next}$ is fuzzified as inward, small, medium, and large, with corresponding ranges being respectively $$[L_{min}, B], \left[B, B + \frac{1}{2}(L_{max} - B)\right],$$

-continued $$\left[B+\frac{1}{3}(L_{max}-B), B+\frac{2}{3}(L_{max}-B)\right], \text{ and } \left[B+\frac{1}{2}(L_{max}-B), L_{max}\right].$$

All the inputs use a triangle method as a membership function, and have respective membership values being $\mu_y$.

③ Fuzzy rules and reasoning

IF $y_{pt}-y_{pt-1}$=inward THEN $\Delta y_{next}$=inward;

IF $y_{pt}-y_{pt-1}$=small swing outward AND $y_{en}$=very near, THEN $\Delta y_{next}$=small;

IF $y_{pt}-y_{pt-1}$=small swing outward AND $y_{en}$=near, THEN $\Delta y_{next}$=small;

IF $y_{pt}-y_{pt-1}$=small swing outward AND $y_{en}$=medium, THEN $\Delta y_{next}$=medium;

IF $y_{pt}-y_{pt-1}$=small swing outward AND $y_{en}$=far, THEN $\Delta y_{next}$=large;

IF $y_{pt}-y_{pt-1}$=small swing outward AND $y_{en}$=very far, THEN $\Delta y_{next}$=large;

IF $y_{pt}-y_{pt-1}$=medium swing outward AND $y_{en}$=very near, THEN $\Delta y_{next}$=small;

IF $y_{pt}-y_{pt-1}$=medium swing outward AND $y_{en}$=near, THEN $\Delta y_{next}$=small;

IF $y_{pt}-y_{pt-1}$=medium swing outward AND $y_{en}$=medium, THEN $\Delta y_{next}$=medium;

IF $y_{pt}-y_{pt-1}$=medium swing outward AND $y_{en}$=far, THEN $\Delta y_{next}$=large;

IF $y_{pt}-y_{pt-1}$=medium swing outward AND $y_{en}$=very far, THEN $\Delta y_{next}$=large;

IF $y_{pt}-y_{pt-1}$=big swing outward AND $y_{en}$=very near, THEN $\Delta y_{next}$=small;

IF $y_{pt}-y_{pt-1}$=big swing outward AND $y_{en}$=near, THEN $\Delta y_{next}$=small;

IF $y_{pt}-y_{pt-1}$=big swing outward AND $y_{en}$=medium, THEN $\Delta y_{next}$=medium;

IF $y_{pt}-y_{pt-1}$=big swing outward AND $y_{en}$=far, THEN $\Delta y_{next}$=large;

IF $y_{pt}-y_{pt-1}$=big swing outward AND $y_{en}$=very far, THEN $\Delta y_{next}$=large.

④ Defuzzification

Defuzzification is performed using a centroid method:

$$\Delta y_{next} = \frac{(y_{pt}-y_{pt-1})\mu_{y_{pt}-y_{pt-1}} + y_{en}\mu_{y_{en}}}{\mu_{y_{pt}-y_{pt-1}} + \mu_{y_{en}}} \quad (3)$$

The process of fuzzy processing on $\theta_{sd}$ and $\theta_{pt}$ is as follows:

① The current support foot of the biped robot is the swing foot in the previous step, and thus the value of the yaw angle $\theta_{sd}$ of the support foot of the biped robot is the value $\theta_{next-1}$ of the swing foot in the previous step, and is used as an input, and a yaw angle in the next step is predicted through a yaw angle in the previous step; $\theta_{pt}$ is obtained from equations (4) and (5) and is used as another input, and the yaw angle in the next step is predicted through the yaw angle in the previous step.

$$(x_{pt+1}, y_{pt+1}) = \min_{1 \le i \le n} \sqrt{(x_{next}-x_i)^2 + (y_{next}-y_i)^2} \quad (4)$$

$$\theta_{pt} = \tan^{-1}\frac{y_{pt+1}-y_{pt}}{x_{pt+1}-x_{pt}} \quad (5)$$

where $x_{pt+1}$, $y_{pt+1}$ is a path node closest to a foothold position after a current swing foot lands.

② Fuzzification processing

A variation range of $\theta_{sd}$ is $[-\theta_{min}, \theta_{max}]$, and the range is fuzzified and divided into four stages: inward yaw, small-amplitude outward yaw, medium-amplitude outward yaw, and large-amplitude outward yaw, with corresponding ranges being respectively $$[-\theta_{min}, 0], \left[0, \frac{1}{2}\theta_{max}\right], \left[\frac{1}{3}\theta_{max}, \frac{2}{3}\theta_{max}\right], \text{ and } \left[\frac{1}{2}\theta_{max}, \theta_{max}\right];$$

the range of $\theta_{pt}$ is approximately represented as $$\left[-\frac{\pi}{2}, \frac{\pi}{2}\right],$$

and is fuzzified as negative big orientation, negative small orientation, medium, positive small orientation, and positive big orientation, with corresponding ranges being respectively $$\left[-\frac{\pi}{2}, -\frac{\pi}{4}\right], \left[-\frac{\pi}{3}, -\frac{\pi}{6}\right], \left[-\frac{\pi}{4}, \frac{\pi}{4}\right], \left[\frac{\pi}{6}, \frac{\pi}{3}\right], \text{ and } \left[\frac{\pi}{4}, \frac{\pi}{2}\right];$$

the output $\Delta\theta_{next}$ is fuzzified as inward yaw, small-amplitude outward yaw, medium-amplitude outward yaw, and large-amplitude outward yaw, with corresponding ranges being respectively $$[-\theta_{min}, 0], \left[0, \frac{1}{2}\theta_{max}\right], \left[\frac{1}{3}\theta_{max}, \frac{2}{3}\theta_{max}\right], \text{ and } \left[\frac{1}{2}\theta_{max}, \theta_{max}\right].$$

All the inputs use a triangle method as a membership function, and have respective membership values being $\mu_\theta$.

③ Fuzzy rules and reasoning

When the support foot is a left foot:

IF $\theta_{sd}$=inward yaw AND $\theta_{pt}$=negative big orientation, THEN $\Delta\theta_{next}$=large-amplitude outward yaw;

IF $\theta_{sd}$=inward yaw AND $\theta_{pt}$=negative small orientation, THEN $\Delta\theta_{next}$=medium-amplitude outward yaw;

IF $\theta_{sd}$=inward yaw AND $\theta_{pt}$=medium, THEN $\Delta\theta_{next}$=small-amplitude outward yaw;

IF $\theta_{sd}$=inward yaw AND $\theta_{pt}$=positive small orientation, THEN $\Delta\theta_{next}$=inward yaw;

IF $\theta_{sd}$=inward yaw AND $\theta_{pt}$=positive big orientation, THEN $\Delta\theta_{next}$=inward yaw;

IF $\theta_{sd}$=small-amplitude outward yaw AND $\theta_{pt}$=negative big orientation, THEN $\Delta\theta_{next}$=large-amplitude outward yaw;

IF $\theta_{sd}$=small-amplitude outward yaw AND $\theta_{pt}$=negative small orientation, THEN $\Delta\theta_{next}$=medium-amplitude outward yaw;

IF $\theta_{sd}$=small-amplitude outward yaw AND $\theta_{pt}$=medium, THEN $\Delta\theta_{next}$=small-amplitude outward yaw;

IF $\theta_{sd}$=small-amplitude outward yaw AND $\theta_{pt}$=positive small orientation, THEN $\Delta\theta_{next}$=inward yaw;

IF $\theta_{sd}$=small-amplitude outward yaw AND $\theta_{pt}$=positive big orientation, THEN $\Delta\theta_{next}$=inward yaw;

IF $\theta_{sd}$=medium-amplitude outward yaw AND $\theta_{pt}$=negative big orientation, THEN $\Delta\theta_{next}$=large-amplitude outward yaw;

IF $\theta_{sd}$=medium-amplitude outward yaw AND $\theta_{pt}$=negative small orientation, THEN $\Delta\theta_{next}$=medium-amplitude outward yaw;

IF $\theta_{sd}$=medium-amplitude outward yaw AND $\theta_{pt}$=medium, THEN $\Delta\theta_{next}$=inward yaw;

IF $\theta_{sd}$=medium-amplitude outward yaw AND $\theta_{pt}$=positive small orientation, THEN $\Delta\theta_{next}$=inward yaw;

IF $\theta_{sd}$=medium-amplitude outward yaw AND $\theta_{pt}$=positive big orientation, THEN $\Delta\theta_{next}$=inward yaw;

IF $\theta_{sd}$=large-amplitude outward yaw AND $\theta_{pt}$=negative big orientation, THEN $\Delta\theta_{next}$=medium-amplitude outward yaw;

IF $\theta_{sd}$=large-amplitude outward yaw AND $\theta_{pt}$=negative small orientation, THEN $\Delta\theta_{next}$=small-amplitude outward yaw;

IF $\theta_{sd}$=large-amplitude outward yaw AND $\theta_{pt}$=medium, THEN $\Delta\theta_{next}$=inward yaw;

IF $\theta_{sd}$=large-amplitude outward yaw AND $\theta_{pt}$=positive small orientation, THEN $\Delta\theta_{next}$=inward yaw;

IF $\theta_{sd}$=large-amplitude outward yaw AND $\theta_{pt}$=positive big orientation, THEN $\Delta\theta_{next}$=inward yaw;

When the support foot is a right foot:

IF $\theta_{sd}$=inward yaw AND $\theta_{pt}$=negative big orientation, THEN $\Delta\theta_{next}$=inward yaw;

IF $\theta_{sd}$=inward yaw AND $\theta_{pt}$=negative small orientation, THEN $\Delta\theta_{next}$=inward yaw;

IF $\theta_{sd}$=inward yaw AND $\theta_{pt}$=medium, THEN $\Delta\theta_{next}$=small-amplitude outward yaw;

IF $\theta_{sd}$=inward yaw AND $\theta_{pt}$=positive small orientation, THEN $\Delta\theta_{next}$=medium-amplitude outward yaw;

IF $\theta_{sd}$=inward yaw AND $\theta_{pt}$=positive big orientation, THEN $\Delta\theta_{next}$=large-amplitude outward yaw;

IF $\theta_{sd}$=small-amplitude outward yaw AND $\theta_{pt}$=negative big orientation, THEN $\Delta\theta_{next}$=inward yaw;

IF $\theta_{sd}$=small-amplitude outward yaw AND $\theta_{pt}$=negative small orientation, THEN $\Delta\theta_{next}$=inward yaw;

IF $\theta_{sd}$=small-amplitude outward yaw AND $\theta_{pt}$=medium, THEN $\Delta\theta_{next}$=small-amplitude outward yaw;

IF $\theta_{sd}$=small-amplitude outward yaw AND $\theta_{pt}$=positive small orientation, THEN $\Delta\theta_{next}$=medium-amplitude outward yaw;

IF $\theta_{sd}$=small-amplitude outward yaw AND $\theta_{pt}$=positive big orientation, THEN $\Delta\theta_{next}$=large-amplitude outward yaw;

IF $\theta_{sd}$=medium-amplitude outward yaw AND $\theta_{pt}$=negative big orientation, THEN $\Delta\theta_{next}$=inward yaw;

IF $\theta_{sd}$=medium-amplitude outward yaw AND $\theta_{pt}$=negative small orientation, THEN $\Delta\theta_{next}$=inward yaw;

IF $\theta_{sd}$=medium-amplitude outward yaw AND $\theta_{pt}$=medium, THEN $\Delta\theta_{next}$=inward yaw;

IF $\theta_{sd}$=medium-amplitude outward yaw AND $\theta_{pt}$=positive small orientation, THEN $\Delta\theta_{next}$=small-amplitude outward yaw;

IF $\theta_{sd}$=medium-amplitude outward yaw AND $\theta_{pt}$=positive big orientation, THEN $\Delta\theta_{next}$=medium-amplitude inward yaw;

IF $\theta_{sd}$=large-amplitude outward yaw AND $\theta_{pt}$=negative big orientation, THEN $\Delta\theta_{next}$=inward yaw;

IF $\theta_{sd}$=large-amplitude outward yaw AND $\theta_{pt}$=negative small orientation, THEN $\Delta\theta_{next}$=inward yaw;

IF $\theta_{sd}$=large-amplitude outward yaw AND $\theta_{pt}$=medium, THEN $\Delta\theta_{next}$=inward yaw;

IF $\theta_{sd}$=large-amplitude outward yaw AND $\theta_{pt}$=positive small orientation, THEN $\Delta\theta_{next}$=small-amplitude outward yaw;

IF $\theta_{sd}$=large-amplitude outward yaw AND $\theta_{pt}$=positive big orientation, THEN $\Delta\theta_{next}$=medium-amplitude inward yaw.

④ Defuzzification

Defuzzification is performed using a centroid method:

$$\Delta\theta_{next} = \frac{\theta_{pt}\mu_{\theta_{pt}} + \theta_{sd}\mu_{\theta_{sd}}}{\mu_{\theta_{pt}} + \mu_{\theta_{sd}}} \qquad (6)$$

Finally, the three outputs ($x_{next}$, $y_{next}$, $\theta_{next}$) of the fuzzy controller are:

$x_{next}=x_{sd}+\Delta x_{next}$, $y_{next}=y_{sd}+\Delta y_{next}$, $\theta_{next}=\theta_{sd}+\Delta\theta_{next}$ Thus, the specific foothold position of the biped robot in the world coordinate system can be determined.

The described embodiments are preferred embodiments of the present disclosure, but the present disclosure is not limited to the aforementioned embodiments. Any obvious improvements, substitutions or modifications that can be made by those skilled in the art without departing from the essential content of the present disclosure shall fall within the protection scope of the present disclosure.

What is claimed is:

1. A control method of a foothold position control system for a biped robot, wherein the foothold position control system comprises a laser radar or vision sensor, a gyroscope, a six-component force sensor, and an industrial computer, wherein a fuzzy controller in the industrial computer separately uses $x_{sd}$, $x_{en}$, $y_{sd}$, $y_{en}$, $\theta_{sd}$, and $\theta_{pt}$ as inputs and performs fuzzy processing to obtain a specific foothold position of a swing foot in an available foothold area, wherein $x_{sd}$, $y_{sd}$ is a real-time position of a support foot of a biped robot obtained by the six-component force sensor, $x_{en}$, $y_{en}$ is a position of an obstacle in a robot body coordinate system obtained by the laser radar or vision sensor, $\theta_{sd}$ is an initial yaw angle of the biped robot obtained by the gyroscope, and $\theta_{pt}$ is an angle between a straight line formed by a current path node and an associated path node in a next step and an x axis of a world coordinate system;

wherein the control method comprising:

planning a passing path;

determining the available foothold area of the swing foot on the passing path according to step-length constraints, movement capabilities, foot sizes, and center offsets of the biped robot; and performing fuzzy processing to determine a specific foothold position of the biped robot;

wherein the fuzzy processing comprises fuzzification, fuzzy rule reasoning, and defuzzification;

wherein a process of the fuzzy processing on $x_{en}$ and $x_{sd}$ is: inputting $x_{pt}-x_{pt-1}$ and $x_{en}$, and outputting $\Delta^x_{next}$;

(1) fuzzification fuzzifying $x_{pt}-x_{pt-1}$ as backward, small step forward, medium step forward, and big step forward, with corresponding ranges being respectively $$[-D_{min}, 0], \left[0, \frac{1}{2}D_{max}\right], \left[\frac{1}{3}D_{max}, \frac{2}{3}D_{max}\right], \text{ and } \left[\frac{1}{2}D_{max}, D_{max}\right];$$

fuzzifying $x_{en}$ as very near, near, medium, far, and very far, with corresponding ranges being respectively $$\left[\frac{1}{2}D_{max}, D_{max}\right], \left[\frac{3}{4}D_{max}, 2D_{max}\right], \left[\frac{3}{2}D_{max}, 3D_{max}\right],$$
$$\left[\frac{5}{2}D_{max}, 4D_{max}\right], \text{ and } [4D_{max}, 5D_{max}];$$

fuzzifying $\Delta x_{next}$ as backward, short, medium, and long, with corresponding ranges being respectively $$[-D_{min}, 0], \left[0, \frac{1}{2}D_{max}\right], \left[\frac{1}{3}D_{max}, \frac{2}{3}D_{max}\right], \text{ and } \left[\frac{1}{2}D_{max}, D_{max}\right];$$

wherein $D_{max}$ is a maximum forward movable distance of the swing foot, and $D_{min}$ is a maximum backward movable distance of the swing foot;

(2) fuzzy rule reasoning if $x_{pt}-x_{pt-1}$=backward, then $x_{next}$=backward;
if $x_{pt}-x_{pt-1}$=small step forward, and $x_{en}$=very near, then $x_{next}$=short;
$x_{pt}-x_{pt-1}$=small step forward, and $x_{en}$=near, then $x_{next}$=short;
$x_{pt}-x_{pt-1}$=small step forward, and $x_{en}$=medium, then $x_{next}$=medium;
$x_{pt}-x_{pt-1}$=small step forward, and $x_{en}$=far, then $x_{next}$=long;
$x_{pt}-x_{pt-1}$=small step forward, and $x_{en}$=very far, then $x_{next}$=long;
$x_{pt}-x_{pt-1}$=medium step forward, and $x_{en}$=very near, then $x_{next}$=short;
$x_{pt}-x_{pt-1}$=medium step forward, and $x_{en}$=near, then $x_{next}$=short;
$x_{pt}-x_{pt-1}$=medium step forward, and $x_{en}$=medium, then $x_{next}$=medium;
$x_{pt}-x_{pt-1}$=medium step forward, and $x_{en}$=far, then $x_{next}$=long;
$x_{pt}-x_{pt-1}$=medium step forward, and $x_{en}$=very far, then $x_{next}$=long;
$x_{pt}-x_{pt-1}$=big step forward, and $x_{en}$=very near, then $x_{next}$=short;
$x_{pt}-x_{pt-1}$=big step forward, and $x_{en}$=near, then $x_{next}$=short;
$x_{pt}-x_{pt-1}$=big step forward, and $x_{en}$=medium, then $x_{next}$=medium;
$x_{pt}-x_{pt-1}$=big step forward, and $x_{en}$=far, then $x_{next}$=medium;
$x_{pt}-x_{pt-1}$=big step forward, and $x_{en}$=very far, then $x_{next}$=long; and (3) defuzzification using a centroid method $$\Delta x_{next} = \frac{(x_{pt} - x_{pt-1})\mu_{x_{pt}-x_{pt-1}} + x_{en}\mu_{x_{en}}}{\mu_{x_{pt}-x_{pt-1}} + \mu_{x_{en}}}$$

wherein u is a membership value.

2. The control method according to claim 1, wherein the specific foothold position of the biped robot is ($x_{next}$, $y_{next}$, $\theta_{next}$), wherein $x_{next}=x_{sd}+\Delta x_{next}$, $y_{next}=y_{sd}+\Delta y_{next}$, and $\theta_{next}=\theta_{sd}+\Delta\theta_{next}$.

3. The control method according to claim 1, wherein the $$\theta_{pt} = \tan^{-1}\frac{y_{pt+1} - y_{pt}}{x_{pt+1} - x_{pt}}, (x_{pt+1}, y_{pt+1}) = \min_{1 \leq i \leq n}\sqrt{(x_{next} - x_i)^2 + (y_{next} - y_i)^2};$$

wherein $x_{pt}$, $y_{pt}$ is a path node closest to a position of a current support foot, $x_{pt+1}$, $y_{pt+1}$ is a path node closest to a foothold position after a current swing foot lands, $x_{next}$, $y_{next}$ is a specific foothold position of the swing foot in an available foothold range, and $x_i$, $y_i$ is a path node.

4. The control method according to claim 2, wherein the $$\theta_{pt} = \tan^{-1}\frac{y_{pt+1} - y_{pt}}{x_{pt+1} - x_{pt}}, (x_{pt+1}, y_{pt+1}) = \min_{1 \leq i \leq n}\sqrt{(x_{next} - x_i)^2 + (y_{next} - y_i)^2};$$

wherein $x_{pt}$, $y_{pt}$ is a path node closest to a position of a current support foot, $x_{pt+1}$, $y_{pt+1}$ is a path node closest to a foothold position after a current swing foot lands, $x_{next}$, $y_{next}$ is a specific foothold position of the swing foot in an available foothold range, and $x_i$, $y_i$ is a path node.

5. A control method of a foothold position control system for a biped robot, wherein the foothold position control system comprises a laser radar or vision sensor, a gyroscope, a six-component force sensor, and an industrial computer, wherein a fuzzy controller in the industrial computer separately uses $x_{sd}$, $x_{en}$, $y_{sd}$, $y_{en}$, $\theta_{sd}$, and $\theta_{pt}$ as inputs and performs fuzzy processing to obtain a specific foothold position of a swing foot in an available foothold area, wherein $x_{sd}$, $y_{sd}$ is a real-time position of a support foot of a biped robot obtained by the six-component force sensor, $x_{en}$, $y_{en}$ is a position of an obstacle in a robot body coordinate system obtained by the laser radar or vision sensor, $\theta_{sd}$ is an initial yaw angle of the biped robot obtained by the gyroscope, and $\theta_{pt}$ is an angle between a straight line formed by a current path node and an associated path node in a next step and an x axis of a world coordinate system;

wherein the control method comprising:
planning a passing path;
determining the available foothold area of the swing foot on the passing path according to step-length constraints, movement capabilities, foot sizes, and center offsets of the biped robot; and
performing fuzzy processing to determine a specific foothold position of the biped robot;
wherein the fuzzy processing comprises fuzzification, fuzzy rule reasoning, and defuzzification;
wherein a process of the fuzzy processing on $y_{en}$ and $y_{sd}$ is: inputting $y_{pt}-y_{pt-1}$ and $y_{en}$, and outputting $\Delta y_{next}$;

(1) fuzzification
fuzzifying $y_{pt}-y_{pt-1}$ as inward, small swing outward, medium swing outward, and big swing outward, with corresponding ranges being respectively $$[L_{min}, B], \left[B, B + \frac{1}{2}(L_{max} - B)\right],$$
$$\left[B + \frac{1}{3}(L_{max} - B), B + \frac{2}{3}(L_{max} - B)\right], \text{ and } \left[B + \frac{1}{2}(L_{max} - B), L_{max}\right];$$

fuzzifying $y_{en}$ as very near, near, medium, far, and very far, with corresponding ranges being respectively $$[L_{max}, 2L_{max}], \left[\frac{3}{2}L_{max}, \frac{5}{2}L_{max}\right], [2L_{max}, 3L_{max}],$$
$$\left[\frac{5}{2}L_{max}, \frac{7}{2}L_{max}\right], \text{ and } [3L_{max}, 4L_{max}];$$

fuzzifying $\Delta y_{next}$ as inward, small, medium, and large, with corresponding ranges being respectively $$[L_{min}, B], \left[B, B + \frac{1}{2}(L_{max} - B)\right],$$
$$\left[B + \frac{1}{3}(L_{max} - B), B + \frac{2}{3}(L_{max} - B)\right], \text{ and } \left[B + \frac{1}{2}(L_{max} - B), L_{max}\right];$$

wherein $L_{max}$ is a maximum outward movable distance, $L_{min}$ is a maximum inward movable distance, and B is a distance between projections of centers of gravity of two legs when the biped robot stands upright;

(2) fuzzy rule reasoning if $y_{pt}-y_{pt-1}$=inward, then $\Delta y_{next}$=inward;

if $y_{pt}-y_{pt-1}$=small swing outward, and $y_{en}$=very near, then $\Delta y_{next}$=small;

if $y_{pt}-y_{pt-1}$=small swing outward, and $y_{en}$=near, then $\Delta y_{next}$=small;

if $y_{pt}-y_{pt-1}$=small swing outward, and $y_{en}$=medium, then $\Delta y_{next}$=medium;

if $y_{pt}-y_{pt-1}$=small swing outward, and $y_{en}$=far, then $\Delta y_{next}$=large;

if $y_{pt}-y_{pt-1}$=small swing outward, and $y_{en}$=very far, then $\Delta y_{next}$=large;

if $y_{pt}-y_{pt-1}$=medium swing outward, and $y_{en}$=very near, then $\Delta y_{next}$=small;

if $y_{pt}-y_{pt-1}$=medium swing outward, and $y_{en}$=near, then $\Delta y_{next}$=small;

if $y_{pt}-y_{pt-1}$=medium swing outward, and $y_{en}$=medium, then $\Delta y_{next}$=medium;

if $y_{pt}-y_{pt-1}$=medium swing outward, and $y_{en}$=far, then $\Delta y_{next}$=large;

if $y_{pt}-y_{pt-1}$=medium swing outward, and $y_{en}$=very far, then $\Delta y_{next}$=large;

if $y_{pt}-y_{pt-1}$=big swing outward, and $y_{en}$=very near, then $\Delta y_{next}$=small;

if $y_{pt}-y_{pt-1}$=big swing outward, and $y_{en}$=near, then $\Delta y_{next}$=small;

if $y_{pt}-y_{pt-1}$=big swing outward, and $y_{en}$=medium, then $\Delta y_{next}$=medium;

if $y_{pt}-y_{pt-1}$=big swing outward, and $y_{en}$=far, then $\Delta y_{next}$=large;

if $y_{pt}-y_{pt-1}$=big swing outward, and $y_{en}$=very far, then $\Delta y_{next}$=large; and (3) defuzzification using a centroid method $$\Delta y_{next} = \frac{(y_{pt} - y_{pt-1})\mu_{y_{pt}-y_{pt-1}} + y_{en}\mu_{y_{en}}}{\mu_{y_{pt}y_{pt-1}} + \mu_{y_{en}}}$$

wherein u is a membership value.

6. The control method according to claim 5, wherein the specific foothold position of the biped robot is ($x_{next}$, $y_{next}$, $\theta_{next}$), wherein $x_{next}=x_{sd}+\Delta x_{next}$, $y_{next}=y_{sd}+\Delta y_{next}$, and $\theta_{next}=\theta_{sd}+\Delta\theta_{next}$.

7. The control method according to claim 5, wherein the $$\theta_{pt} = \tan^{-1}\frac{y_{pt+1} - y_{pt}}{x_{pt+1} - x_{pt}}, (x_{pt+1}, y_{pt+1}) = \min_{1 \leq i \leq n}\sqrt{(x_{next} - x_i)^2 + (y_{next} - y_i)^2};$$

wherein $x_{pt}$, $y_{pt}$ is a path node closest to a position of a current support foot, $x_{pt+1}$, $y_{pt+1}$ is a path node closest to a foothold position after a current swing foot lands, $x_{next}$, $y_{next}$ is a specific foothold position of the swing foot in an available foothold range, and $x_i$, $y_i$ is a path node.

8. The control method according to claim 6, wherein the $$\theta_{pt} = \tan^{-1}\frac{y_{pt+1} - y_{pt}}{x_{pt+1} - x_{pt}}, (x_{pt+1}, y_{pt+1}) = \min_{1 \leq i \leq n}\sqrt{(x_{next} - x_i)^2 + (y_{next} - y_i)^2};$$

wherein $x_{pt}$, $y_{pt}$ is a path node closest to a position of a current support foot, $x_{pt+1}$, $y_{pt+1}$ is a path node closest to a foothold position after a current swing foot lands, $x_{next}$, $y_{next}$ is a specific foothold position of the swing foot in an available foothold range, and $x_i$, $y_i$ is a path node.

9. A control method of a foothold position control system for a biped robot, wherein the foothold position control system comprises a laser radar or vision sensor, a gyroscope, a six-component force sensor, and an industrial computer, wherein a fuzzy controller in the industrial computer separately uses $x_{sd}$, $x_{en}$, $y_{sd}$, $y_{en}$, $\theta_{sd}$, and $\theta_{pt}$ as inputs and performs fuzzy processing to obtain a specific foothold position of a swing foot in an available foothold area, wherein $x_{sd}$, $y_{sd}$ is a real-time position of a support foot of a biped robot obtained by the six-component force sensor, $x_{en}$, $y_{en}$ is a position of an obstacle in a robot body coordinate system obtained by the laser radar or vision sensor, $\theta_{sd}$ is an initial yaw angle of the biped robot obtained by the gyroscope, and $\theta_{pt}$ is an angle between a straight line formed by a current path node and an associated path node in a next step and an x axis of a world coordinate system;

wherein the control method comprising:

planning a passing path;

determining the available foothold area of the swing foot on the passing path according to step-length constraints, movement capabilities, foot sizes, and center offsets of the biped robot; and performing fuzzy processing to determine a specific foothold position of the biped robot;

wherein the fuzzy processing comprises fuzzification, fuzzy rule reasoning, and defuzzification;

wherein a process of the fuzzy processing on $\theta_{sd}$ and $\theta_{pt}$ is: inputting $\theta_{sd}$ and $\theta_{pt}$, and outputting $\Delta\theta_{next}$;

(1) fuzzification fuzzifying $\theta_{sd}$ as inward yaw, small-amplitude outward yaw, medium-amplitude outward yaw, and large-amplitude outward yaw, with corresponding ranges being respectively $$[-\theta_{min}, 0], \left[0, \frac{1}{2}\theta_{max}\right], \left[\frac{1}{3}\theta_{max}, \frac{2}{3}\theta_{max}\right], \text{ and } \left[\frac{1}{2}\theta_{max}, \theta_{max}\right];$$

fuzzifying $\theta_{pt}$ as negative big orientation, negative small orientation, medium, positive small orientation, and positive big orientation, with corresponding ranges being respectively $$\left[-\frac{\pi}{2}, -\frac{\pi}{4}\right], \left[-\frac{\pi}{3}, -\frac{\pi}{6}\right], \left[-\frac{\pi}{4}, \frac{\pi}{4}\right], \left[\frac{\pi}{6}, \frac{\pi}{3}\right], \text{ and } \left[\frac{\pi}{4}, \frac{\pi}{2}\right];$$

fuzzifying $\Delta\theta_{next}$ as inward yaw, small-amplitude outward yaw, medium-amplitude outward yaw, and large-amplitude outward yaw, with corresponding ranges being respectively $$[-\theta_{min}, 0], \left[0, \frac{1}{2}\theta_{max}\right], \left[\frac{1}{3}\theta_{max}, \frac{2}{3}\theta_{max}\right], \text{ and } \left[\frac{1}{2}\theta_{max}, \theta_{max}\right];$$

wherein $\theta_{min}$ is a maximum inward yaw angle of the swing foot, and $\theta_{max}$ is a maximum outward yaw angle of the swing foot;

(2) fuzzy rule reasoning when the support foot is a left foot:

if $\theta_{sd}$=inward yaw, and $\theta_{pt}$=negative big orientation, then $\Delta\theta_{next}$=large-amplitude outward yaw;

if $\theta_{sd}$=inward yaw, and $\theta_{pt}$=negative small orientation, then $\Delta\theta_{next}$=medium-amplitude outward yaw;

if $\theta_{sd}$=inward yaw, and $\theta_{pt}$=medium, then $\Delta\theta_{next}$=small-amplitude outward yaw;
if $\theta_{sd}$=inward yaw, and $\theta_{pt}$=positive small orientation, then $\Delta\theta_{next}$=inward yaw;
if $\theta_{sd}$=inward yaw, and $\theta_{pt}$=positive big orientation, then $\Delta\theta_{next}$=inward yaw;
if $\theta_{sd}$=small-amplitude outward yaw, and $\theta_{pt}$=negative big orientation, then $\Delta\theta_{next}$=large-amplitude outward yaw;
if $\theta_{sd}$=small-amplitude outward yaw, and $\theta_{pt}$=negative small orientation, then $\Delta\theta_{next}$=medium-amplitude outward yaw;
if $\theta_{sd}$=small-amplitude outward yaw, and $\theta_{pt}$=medium, then $\Delta\theta_{next}$=small-amplitude outward yaw;
if $\theta_{sd}$=small-amplitude outward yaw, and $\theta_{pt}$=positive small orientation, then $\Delta\theta_{next}$=inward yaw;
if $\theta_{sd}$=small-amplitude outward yaw, and $\theta_{pt}$=positive big orientation, then $\Delta\theta_{next}$=inward yaw;
if $\theta_{sd}$=medium-amplitude outward yaw, and $\theta_{pt}$=negative big orientation, then $\Delta\theta_{next}$=large-amplitude outward yaw;
if $\theta_{sd}$=medium-amplitude outward yaw, and $\theta_{pt}$=negative small orientation, then $\Delta\theta_{next}$=medium-amplitude outward yaw;
if $\theta_{sd}$=medium-amplitude outward yaw, and $\theta_{pt}$=medium, then $\Delta\theta_{next}$=inward yaw;
if $\theta_{sd}$=medium-amplitude outward yaw, and $\theta_{pt}$=positive small orientation, then $\Delta\theta_{next}$=inward yaw;
if $\theta_{sd}$=medium-amplitude outward yaw, and $\theta_{pt}$=positive big orientation, then $\Delta\theta_{next}$=inward yaw;
if $\theta_{sd}$=large-amplitude outward yaw, and $\theta_{pt}$=negative big orientation, then $\Delta\theta_{next}$=medium-amplitude outward yaw;
if $\theta_{sd}$=large-amplitude outward yaw, and $\theta_{pt}$=negative small orientation, then $\Delta\theta_{next}$=small-amplitude outward yaw;
if $\theta_{sd}$=large-amplitude outward yaw, and $\theta_{pt}$=medium, then $\Delta\theta_{next}$=inward yaw;
if $\theta_{sd}$=large-amplitude outward yaw, and $\theta_{pt}$=positive small orientation, then $\Delta\theta_{next}$=inward yaw;
if $\theta_{sd}$=large-amplitude outward yaw, and $\theta_{pt}$=positive big orientation, then $\Delta\theta_{next}$=inward yaw;
when the support foot is a right foot:
if $\theta_{sd}$=inward yaw, and $\theta_{pt}$=negative big orientation, then $\Delta\theta_{next}$=inward yaw;
if $\theta_{sd}$=inward yaw, and $\theta_{pt}$=negative small orientation, then $\Delta\theta_{next}$=inward yaw;
if $\theta_{sd}$=inward yaw, and $\theta_{pt}$=medium, then $\Delta\theta_{next}$=small-amplitude outward yaw;
if $\theta_{sd}$=inward yaw, and $\theta_{pt}$=positive small orientation, then $\Delta\theta_{next}$=medium-amplitude outward yaw;
if $\theta_{sd}$=inward yaw, and $\theta_{pt}$=positive big orientation, then $\Delta\theta_{next}$=large-amplitude outward yaw;
if $\theta_{sd}$=small-amplitude outward yaw, and $\theta_{pt}$=negative big orientation, then $\Delta\theta_{next}$=inward yaw;
if $\theta_{sd}$=small-amplitude outward yaw, and $\theta_{pt}$=negative small orientation, then $\Delta\theta_{next}$=inward yaw;
if $\theta_{sd}$=small-amplitude outward yaw, and $\theta_{pt}$=medium, then $\Delta\theta_{next}$=small-amplitude outward yaw;
if $\theta_{sd}$=small-amplitude outward yaw, and $\theta_{pt}$=positive small orientation, then $\Delta\theta_{next}$=medium-amplitude outward yaw;
if $\theta_{sd}$=small-amplitude outward yaw, and $\theta_{pt}$=positive big orientation, then $\Delta\theta_{next}$=large-amplitude outward yaw;
if $\theta_{sd}$=medium-amplitude outward yaw, and $\theta_{pt}$=negative big orientation, then $\Delta\theta_{next}$=inward yaw;
if $\theta_{sd}$=medium-amplitude outward yaw, and $\theta_{pt}$=negative small orientation, then $\Delta\theta_{next}$=inward yaw;
if $\theta_{sd}$=medium-amplitude outward yaw, and $\theta_{pt}$=medium, then $\Delta\theta_{next}$=inward yaw;
if $\propto_{sd}$=medium-amplitude outward yaw, and $\theta_{pt}$=positive small orientation, then $\Delta\theta_{next}$=small-amplitude outward yaw;
if $\theta_{sd}$=medium-amplitude outward yaw, and $\theta_{pt}$=positive big orientation, then $\Delta\theta_{next}$=medium-amplitude inward yaw;
if $\theta_{sd}$=large-amplitude outward yaw, and $\theta_{pt}$=negative big orientation, then $\Delta\theta_{next}$=inward yaw;
if $\theta_{sd}$=large-amplitude outward yaw, and $\theta_{pt}$=negative small orientation, then $\Delta\theta_{next}$=inward yaw;
if $\theta_{sd}$=large-amplitude outward yaw, and $\theta_{pt}$=medium, then $\Delta\theta_{next}$=inward yaw;
if $\theta_{sd}$=large-amplitude outward yaw, and $\theta_{pt}$=positive small orientation, then $\Delta\theta_{next}$=small-amplitude outward yaw;
if $\theta_{sd}$=large-amplitude outward yaw, and $\theta_{pt}$=positive big orientation, then $\Delta\theta_{next}$=medium-amplitude inward yaw; and (3) defuzzification defuzzification using a centroid method:

$$\Delta\theta_{next} = \frac{\theta_{pt}\mu_{\theta_{pt}} + \theta_{sd}\mu_{\theta_{sd}}}{\mu_{\theta_{pt}} + \mu_{\theta_{sd}}}$$

wherein u is a membership value.

10. The control method according to claim 9, wherein the specific foothold position of the biped robot is ($x_{next}$, $y_{next}$, $\theta_{next}$), wherein $x_{next}=x_{sd}+\Delta x_{next}$, $y_{next}=y_{sd}+\Delta y_{next}$, and $\theta_{next}=\theta_{sd}+\Delta\theta_{next}$.

11. The control method according to claim 9, wherein the $$\theta_{pt} = \tan^{-1}\frac{y_{pt+1} - y_{pt}}{x_{pt+1} - x_{pt}}, (x_{pt+1}, y_{pt+1}) = \min_{1 \le i \le n}\sqrt{(x_{next} - x_i)^2 + (y_{next} - y_i)^2};$$

wherein $x_{pt}$, $y_{pt}$ is a path node closest to a position of a current support foot, $x_{pt+1}$, $y_{pt+1}$ is a path node closest to a foothold position after a current swing foot lands, $x_{next}$, $y_{next}$ is a specific foothold position of the swing foot in an available foothold range, and $x_i$, $y_i$ is a path node.

12. The control method according to claim 10, wherein the $$\theta_{pt} = \tan^{-1}\frac{y_{pt+1} - y_{pt}}{x_{pt+1} - x_{pt}}, (x_{pt+1}, y_{pt+1}) = \min_{1 \le i \le n}\sqrt{(x_{next} - x_i)^2 + (y_{next} - y_i)^2};$$

wherein $x_{pt}$, $y_{pt}$ is a path node closest to a position of a current support foot, $x_{pt+1}$, $y_{pt+1}$ is a path node closest to a foothold position after a current swing foot lands, $x_{next}$, $y_{next}$ is a specific foothold position of the swing foot in an available foothold range, and $x_i$, $y_i$ is a path node.

* * * * *